United States Patent
Naveh et al.

(10) Patent No.: US 6,411,978 B1
(45) Date of Patent: Jun. 25, 2002

(54) MECHANISM FOR BLOCK FLOATING POINT FFT HARDWARE SUPPORT ON A FIXED POINT DIGITAL SIGNAL PROCESSOR

(75) Inventors: Gil Naveh, Hod Hasharon; Eran Weingarten, Ramat-Gan; Haim Granot, Patson Tiqua, all of (IL)

(73) Assignee: Infineon Technologies Ag I. Gr., Munich (DE)

( * ) Notice: Subject to any disclaimer, the term of this patent is extended or adjusted under 35 U.S.C. 154(b) by 0 days.

(21) Appl. No.: 09/318,632

(22) Filed: May 26, 1999

(51) Int. Cl.[7] .............................................. G06F 17/14
(52) U.S. Cl. ...................................... 708/404; 708/498
(58) Field of Search ................................ 708/404, 498, 708/552, 553

(56) References Cited

U.S. PATENT DOCUMENTS

| | | | | |
|---|---|---|---|---|
| 3,800,130 A | * | 3/1974 | Martinson et al. ........... | 708/404 |
| 4,750,145 A | * | 6/1988 | Leavitt ........................ | 708/404 |
| 4,872,132 A | * | 10/1989 | Retter ......................... | 708/404 |
| 5,031,135 A | * | 7/1991 | Patel et al. .................. | 708/553 |
| 5,319,588 A | * | 6/1994 | Haines et al. ............... | 708/552 |
| 5,481,488 A | * | 1/1996 | Luo et al. .................... | 708/404 |

* cited by examiner

Primary Examiner—David H. Malzahn
(74) Attorney, Agent, or Firm—Mark M. Friedman

(57) ABSTRACT

A processor for performing a block floating point Fast Fourier Transform having improved signal to quantization noise ratio performance. In the radix-2 Decimation In Time algorithm, overflow between stages is prevented by a scale down by two invoked by comparison with a fixed comparison constant. Unfortunately, the fixed comparison constant is not always optimum for maximizing the signal to quantization noise ratio, which is degraded by excessive scale down. Moreover, current mechanisms are limited to the radix-2 block floating point FFT. The processor of the present invention provides the programmer with a FFT compare register which is loadable under program control, thus allowing the programmer to adjust the threshold at which scale down of the stage output is activated for better control over the signal to quantization noise ratio. In addition, the present invention supports other FFT structures besides the radix-2 block floating point FFT.

6 Claims, 6 Drawing Sheets

MECHANISM FOR BLOCK FLOATING POINT FFT HARDWARE SUPPORT ON A FIXED POINT DIGITAL SIGNAL PROCESSOR

FIELD AND BACKGROUND OF THE INVENTION

The present invention relates to digital signal processing apparatus and methods, and, more particularly, to apparatus and a method for block floating point Fast Fourier Transform.

Fast Fourier Transform (FFT) is an efficient algorithm for transforming discrete time signals from a time domain representation to a frequency domain representation, and vice versa. The term "Fast Fourier Transform" is actually a generic term for an entire set of efficient Discrete Fourier Transform (DFT) algorithms. The principle upon which these algorithms are based is that a DFT can be recursively decomposed into smaller DFT's. The most popular decomposition method is the radix-2 Decimation In Time (DIT) FFT.

It is customary to represent a DIT FFT by a prior art flow graph made up of simple graph units known as "butterflies", as shown in FIG. 1. A butterfly flow graph has lines (such as a line 102), circles (such as a circle 104), and arrows (such as an arrow 106) as elements. The circles represents summation and the arrows show the direction of data flow. If an arrow has an adjacent number or expression (such as the constant −1 or the expression $W_N^k$), the data value is multiplied by that number or expression. Wherever an arrow does not have an adjacent number or expression, this is considered as an implicit multiplier of 1. Thus, in FIG. 1, an output data value vector 108 (c, d) can be expressed in terms of an input vector 110 (a, b) of data values as follows:

$$c = a + W_N^k \cdot b \quad (1)$$

$$d = a - W_N^k \cdot b \quad (2)$$

where all the numbers are in general complex numbers. Note that each output of the butterfly is a sum of two numbers, for example c is the sum of a and $W_N^k \cdot b$, where the term $W_N^{kn}$ is known in the art as a "twiddle factor" and is defined as $$W_N^{kn} = e^{-2\pi j n k / N} \quad (3)$$

where j in Equation (3) represents the imaginary number. The magnitude of $W_N^k$ is unity. An important characteristic of the product $F = W_N^k \cdot b$ such as in Equation (1) and Equation (2) is that the multiplication can change the magnitude of the components (real or imaginary) by a factor of √2, because the multiplication involves complex numbers. That is, the larger component of the product F can grow up to √2 times the larger component of b:

$$\max(F_{real}, F_{imag}) \leq \sqrt{2} \max(b_{real}, b_{imag}) \quad (4)$$

The main problem of the FFT is that the dynamic range of the complex output data values grows by 2. The dynamic range is the range between the maximum possible value and the minimum possible value:

$$abs(c) \leq 2 \cdot \max(abs(a), abs(b)) \quad (5)$$

$$abs(d) \leq 2 \cdot \max(abs(a), abs(b)) \quad (6)$$

Such growth can cause overflow when writing numbers to data memory, and it is necessary to prevent such overflows.

A flow graph of a prior art DIT FFT is shown in FIG. 2. The FFT size in this figure is N=8. As seen in FIG. 2, an input 208 to the FFT flow graph is a vector x (n) of complex numbers. This vector passes through $\log_2(N)$ stages, each of which is made of N/2 butterflies. In this example, there is a first stage 202, a second stage 204, and a third stage 206, culminating in an output 210. Each output node of each stage involves the addition of two data values, as illustrated in FIG. 1 and in Equation (1) and Equation (2). The data values involved are, in general, complex random variables with similar distributions. Although the standard deviation of each output node grows by a factor of √2 (assuming the inputs are independent), the dynamic range of the output grows by a factor of 2. When working with a fixed point digital signal processor (DSP), such an increase in the dynamic range of the numbers might cause overflows when writing them to the data memory, unless there is a mechanism for overflow protection. (An overview of the field is given in *Digital Signal Processing*, by A. V. Oppenheim and R. W. Schaffer, Prentice-Hall, in the chapter covering quantization effects in fixed-point FFT algorithms.) The dynamic range of the magnitude of the complex output grows by a factor of 2 but the dynamic range of the larger of the output's components (real or imaginary) grows by a factor of 1+√2. The term "processor" herein denotes any data processing device, including, but not limited to digital signal processors.

The simplest solution for the overflow problem is to divide the FFT input vector by N. This guarantees no overflow for all stages of the algorithm, but suffers from low performance in terms of signal to quantization noise ratio (SQNR), where quantization noise refers to the effects of finite word length. Another solution is to divide ("scale down") the output data values of each stage by 2, which also guarantees no overflow for all stages of the algorithm. This solution also has better SQNR performance than dividing the input vector by N, but still does not have enough performance for some applications, such as ADSL (Asymmetric Digital Subscriber Line), especially in 16 bit processors. A third solution, which is the best in terms of SQNR, is to adopt the block floating point technique and attain what is known as block floating point (BFP) FFT. In BFP FFT, the scaling is not done at the output of every stage but only at those stages where overflow occurs (or might occur). That is, if overflow occurs in stage k then the whole stage is recalculated such that every output is recalculated, scaled and then stored in the data memory. This improves the SQNR while preserving the dynamic range to prevent overflow.

The problem with this approach is that it is not efficient for real time implementations. The number of cycles varies from execution to execution and depends on the number of scaled stages in each execution.

The best prior art solution in the current DSP's available in the marker is to modify the decision law for scaling such that recalculation will not be required. As previously noted, in the classical BFP FFT the decision law states that if overflow occurs in the current stage, recalculate and scale before storing to the data memory. In the best prior art solution, recalculation is avoided by making a decision whether to scale down the output data value of stage k on the basis of the output data values of stage k−1. By determining in advance that an overflow might occur in a stage before actually performing the computation of that stage, the output of that stage is scaled down regardless of the result, and the time otherwise wasted in performing an unnecessary computation can be saved. This solution is used, for example, in the Motorola DSP56xxx family and 56lxx family. Processors which support this algorithm contain a scale-before-store (SC) bit and a sticky status bit. (A sticky status bit is a status bit that can be set, but not cleared, by a particular condition, and which can be cleared only by a software command, such as a program instruction, or by a hardware reset, and which therefore retains a record of a positive test for the particular condition regardless of subsequent negative tests for that condition.) The term "set" and the terms "clear" (or "cleared") herein denote distinct preassigned logical states, without any limitation on their specific respective binary or physical representations. For example, a set bit can be represented by a binary 1 and cleared bit can be represented by a binary 0; alternatively, a set bit can be represented by a binary 0 and a cleared bit can be represented by a binary 1. Likewise, as another example, a set bit can be represented by a high voltage level and a cleared bit can be represented by a low voltage level; alternatively, a set bit can be represented by a low voltage level and a cleared bit can be represented by a high voltage level. Any consistent distinct states may be utilized to represent a "set" bit and a "cleared" bit.

The prior art decision process is illustrated conceptually in FIG. 3. Data required for the process includes an FFT sticky status bit (FFTS) 320, a scale-before-store (SC) bit 332, a rounding adjustment 324, and a comparison constant 308. Rounding adjustment 324 is a predetermined constant. Rounding adjustment 324 is not part of the FFT block floating point algorithm, but is needed for good performance.

FIG. 5 illustrates the execution unit output data value partition for the example of a 16-bit processor for both the present invention and for the prior art. For a 16-bit processor, an EU (execution unit) output data value 502 has 40 bits, consisting of an 8-bit extension 504 from bit 32 to bit 39 (sometimes referred to as "guard bits"), a 16-bit high part 506 from bit 16 to bit 31, and a 16-bit low part 508 from bit 0 to bit 15. Bit 0 is the least significant bit in the EU output data value. It is high part 506 which is stored in data memory (unless there is a specific command or mode to do otherwise). In order to insure that high part 506 is rounded to the nearest least significant bit (bit 16), the value 8000 hexadecimal is added to low part 508. Thus, in this non-limiting example, rounding adjustment 324 equals 8000 hexadecimal. If bit 15 equals 0, addition of rounding adjustment 324 will not alter high part 506, but if bit 15 equals 1, addition of rounding adjustment 324 results in a carry into high part 506. Thus, the addition operation results in high part 506 being rounded to the nearest least significant bit (bit 16). (Later, prior to being stored in memory in a step 315, low part 508 is truncated in a truncation operation 319.)

The process starts by clearing FFTS 320 in a clearing step 300, and selectively setting or clearing SC 322 in a step 301. Following this, the process moves to the beginning of an outer loop 302-B, which handles each stage. The process continues with the beginning of an inner loop 304-B, which handles each output component from the stage.

Within each stage, there is the beginning of another loop 304-B for each vector component. At the start is a test 311 to see if SC 322 is set. If SC 322 is set, then 2 times rounding adjustment 324 is added in a step 323. This compensates for the scale down by a factor of 2 in a step 313. These steps are implemented in some prior art processors, such as those of the Motorola DSP56xxx family and 56lxx family, in which the rounding is done before the scale down by 2. In such cases, the rounding unit adds twice the value of rounding adjustment 324, to compensate for the scale down.

Next, as previously discussed, rounding adjustment 324 is added in a step 702 if SC 322 is not set, and 2 times rounding adjustment 324 is added in a step 323 if SC 322 is set. The magnitude of the real and imaginary parts of each output component is next compared with comparison constant 308 in a decision point 306. If the real or imaginary part of any component is greater than comparison constant 308, then FFTS 320 will be set in a step 310. (This will result in the output of the next stage being scaled won by a factor of 2 before being stored in data memory). In step 319 low part 508 (FIG. 5) is truncated, as previously discussed. Then, in a step 315, the component is stored in data memory, thereby ending the inner loop at 304-E. Note that for the first stage, the scale down by 2 depends on whether or not SC 322 has been preset by the programmer.

Prior to the end of each loop of 302-E, a check is made to see if FFTS is set, at a decision point 303. If FFTS 320 is set, then SC 322 is set in a step 305, and FFTS 320 is cleared in a step 307. Note that this part of the process could alternatively be done prior to the beginning of loop 304-B. It is noted in general that FIG. 3 and the accompanying description are conceptual, and that different practical implementations are possible.

The value of comparison constant 308 is predefined and has an impact on the total SQNR of the FFT. Lowering the value of comparison constant 308 will increase, on the average, the number of stages that are scaled and therefore lower the SQNR. Raising the value of comparison constant 308 will improve the SQNR but will increase the probability that an overflow will occur in spite of the precautionary scaling. In the existing DSP's which implement this solution, comparison constant 308 is fixed in the hardware and is equal to 0.25 (where the dynamic range is [−1,1)). It can be shown that 0.25 is a lower bound that guarantees no overflow for all stages of the algorithm.

The problem with this solution is that comparison constant 308 is fixed in the hardware and there is no way for the programmer to change the comparison constant to accommodate different conditions. In some applications a comparison constant with the fixed value of 0.25 achieves insufficient SQNR (for example DMT ADSL), especially in 16 bit processors. Better values of the comparison constant are theoretically available, however, in many cases. First, a larger general lower bound exists (for any FFT length) that improves, by default, the SQNR of the algorithm. Second, for any FFT length and input signal distribution, a different "highest lower bound" exists.

For example, in a 16 point (four-stage) FFT, the worst case input (the case where the output receives the maximum value) is x=c*[1.0000−1.0000i
1.0000−1.0000i
1.0000−1.0000i
1.0000−1.0000i
−1.0000−1.0000i
−1.0000−1.0000i
−1.0000−1.0000i
−1.0000−1.0000i
−1.0000−1.0000i
−1.0000+1.0000i
−1.0000+1.0000i
−1.0000+1.0000i
−1.0000+1.0000i
1.0000+1.0000i
1.0000+1.0000i
1.0000+1.0000i 1.0000+1.0000i]

for c−1 and without scaling at any stage, the FFT output is $$\begin{bmatrix} 0 \\ 0 \\ 0 \\ -5.9864 - 4.0000i \\ 0 \\ 0 \\ 0 \\ -0.7956 - 4.0000i \\ 0 \\ 0 \\ 0 \\ 2.6727 - 4.0000i \\ 0 \\ 0 \\ 0 \\ 20.1094 - 4.0000i \end{bmatrix}$$

Because the dynamic range is [−1,1], the output overflows. Introducing the input vector x to a BFP FFT with a comparison constant value of $2^3/20.1094$, and hence defining $c \leq 2^3/20.1094$ guarantees no overflow at any stage of this example. Since this is a worst case for this 16 point FFT the value $2^3/20.1094$ is a lower bound for this FFT size. The fixed comparison constant value of 0.25 used in prior art processors is thus not optimum for this example, since $0.25<8/20.1094 \approx 0.3978$. There is thus room for improvement in the SQNR by raising the comparison constant, but the programmer has no means of realizing this improvement, because there is no way to control this important aspect of DSP performance. This example illustrates the limitations of the prior art block floating point FFT implementations in achieving optimum performance and giving the programmer control over the block floating point FFT execution. Furthermore, the prior art solution is limited to supporting only Radix-2 block floating point FFT.

There is thus a widely recognized need for, and it would be highly advantageous to have, a mechanism for block floating point FFT which achieves a better signal to quantization noise ratio by permitting optimal run-time adjustment of the comparison constant as well as support for other FFT structures. This goal is attained by the present invention.

SUMMARY OF THE INVENTION

The present invention solves the problem of limitations on the signal to quantization noise ratio and lack of flexibility for the programmer to control the performance of block floating point FFT applications.

The present invention is of a mechanism for improving the SQNR in BFP FFT algorithms implemented on DSP processor by giving the programmer run-time control over the value of the comparison constant, and therefore over the algorithm's performance. This is done by adding a user-loadable FFT compare (FFTC) register to the processor, either to the processor's execution unit (EU) or else outside the execution unit itself, in addition to the dedicated mode FFT bit (FFTB), the compare absolute value unit, and the FFT sticky status bit (FFTS) that already exist in current processors that support BFP FFT algorithms.

The programmer is thus able to write a program executed by the processor, in which the program can control the loading of the FFTC register. The FFTC register can thus contain a programmable comparison constant.

The FFT compare unit compares the absolute value of each number that is stored to the data memory to the FFT compare register FFTC, and, depending on the result of the comparison, the FFTS may be set. For example, if the absolute value of a number written to data memory is bigger than the FFTC value and if the BFP FFT mode is set, then the FFTS is set. This informs the programmer that at least one of the outputs of the current stage exceeds the compare value. Under program control, the FFTS will be cleared and a shifter unit will be configured to scale down by 2 (shift right by one) all the numbers written to data memory in the next stage.

Therefore, according to the present invention there is provided a processor for performing a block floating point FFT on a plurality of data values, the processor executing a program, the processor including: (a) an FFT compare register, the FFT compare register operative to containing a programmable comparison constant which can be loaded under control of the program, the programmable comparison constant having a first magnitude; (b) an execution unit having an output data value, the output data value having a second magnitude; (c) a compare absolute value unit for comparing the second magnitude to the first magnitude; (d) a scale down by 2 unit for dividing the output data value by a factor of 2; (e) a scale-before-store mode for activating the scale down by 2 unit; and (f) an FFT sticky status bit for indicating that the second magnitude has exceeded the magnitude of the first magnitude.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
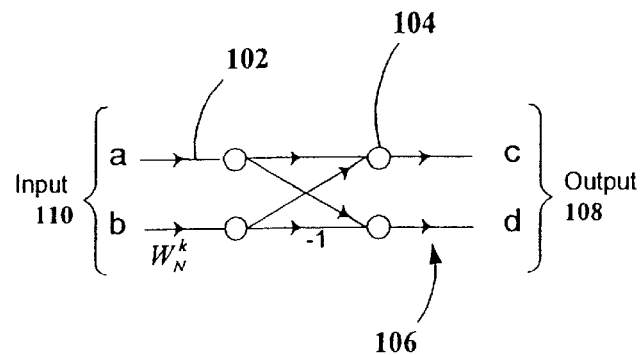
FIG. 1 shows a "butterfly" unit of a prior art flow graph.
Figure 2:
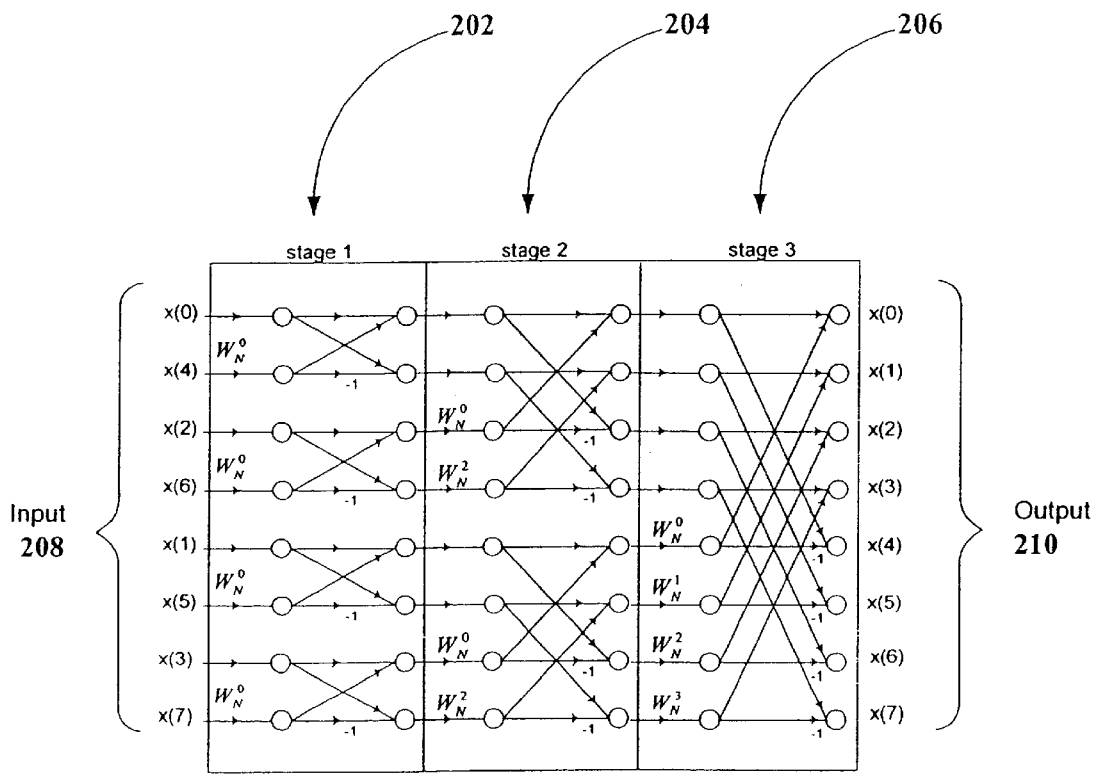
FIG. 2 shows the flow graph of a prior art three-stage DIT FFT.

The principles and operation of a processor for block floating point FFT according to the present invention may be understood with reference to the drawings and the accompanying description. It should be noted that, in the drawings, graphical elements identified with the same numbers represent the same device components or method steps.

Figure 4:
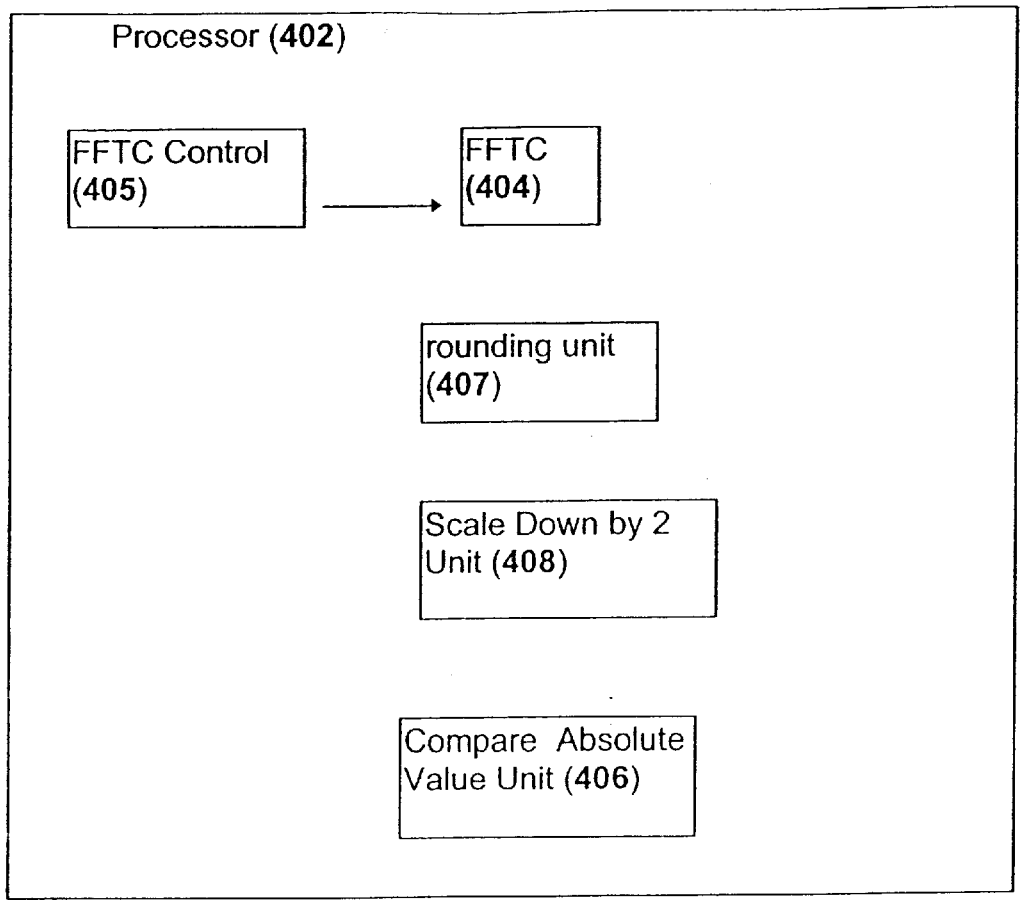
FIG. 4 shows the components of a processor according to the present invention.
Figure 4:
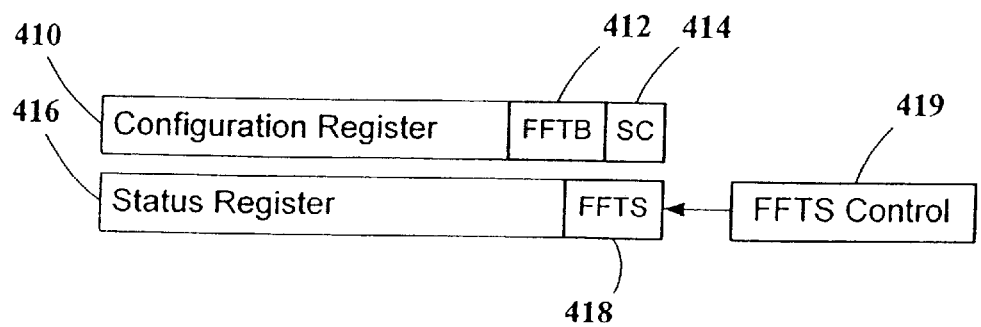

The components of a processor according to the present invention are illustrated in FIG. 4. A processor 402 includes an FFT compare (FFTC) register 404, a compare absolute value unit 406, a rounding unit 407 and a scale down by 2 unit 408. The purpose of FFTC 404 is to contain the comparison constant. The purpose of compare absolute value unit 406 is to compare the data value of a selected word written to data memory against the comparison constant stored in FFTC 404. The purpose of scale down by 2 unit 408 is to divide the output data value of processor 402 by 2 (prior to output by processor 402) by performing, when activated, a single right shift of data. Prior to the operation of scale down by 2 unit 408, preferably rounding unit 407 rounds this data value, either by the value stored in rounding adjustment 324 or else by twice this value, as described in greater detail with regard to FIG. 7. If scale down by 2 unit 408 is not activated, no right shift is performed. In addition, there are two configuration bits in a configuration register 410: an FFT block floating point mode bit (FFTB) 412, and a scale-before-store bit (SC) 414 for enabling a scale-before-store mode. There is also a bit in a status register 416: an FFT sticky status bit (FFTS) 418. The purpose of FFTB 412 is to enable or disable the FFT block floating point mode, the purpose of SC is activating the scale down by 2 unit, and the purpose of FFTS 418 is to indicate the need for a scale down by 2.

Figure 6:
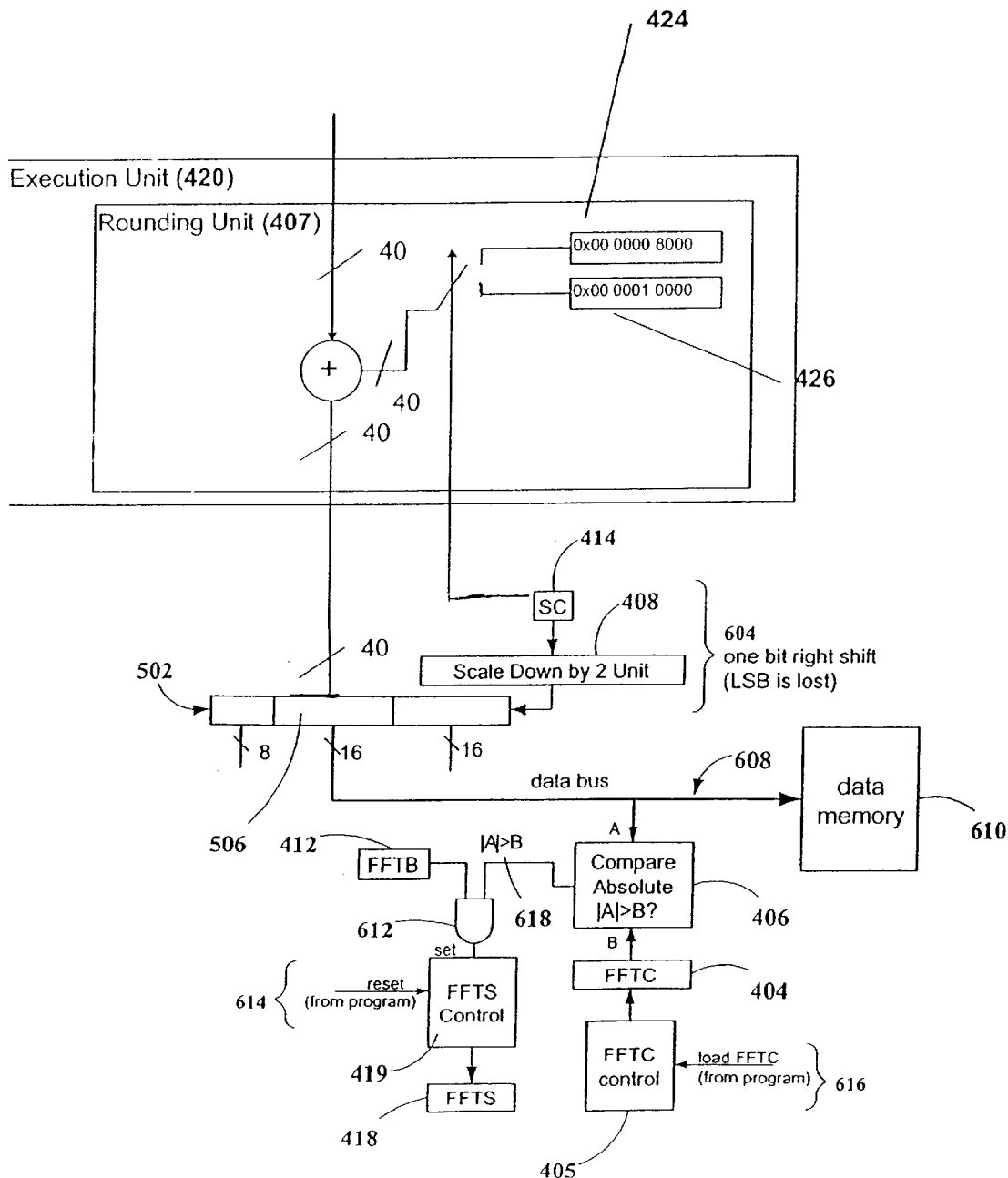
FIG. 6 is a block diagram of the processing according to the present invention.

According to an optional embodiment of the present invention, rounding unit 407, FFTC control 405, FFTC 404, scale down by 2 unit 408 and compare absolute value unit 406 are all contained within an execution unit (not shown). Alternatively and preferably, rounding unit 407 alone is contained within the execution unit, and the remaining components are outside the execution unit as shown in FIG. 6.

Prior art processors contain the functional components describing previously, configuration register 410 containing FFTB 412, and status register 416 containing FFTS 418. Note that the output data value width is usually 40 bits in 16 bit processors and 56 bits in 24 bit processors. Compare absolute value unit 406, scale down by 2 unit 408, and SC 414, are also present in some form in existing processors. FFTC 404 is a new innovation according to the present invention, which can be added to the processor as shown in FIG. 4.

In addition to FFTC 404, a processor according to the present invention requires hardware logic to implement the improved block floating point FFT method, by comparing the absolute value contained in FFTC 404 to that of a word written in data memory. If the absolute value (or "magnitude") of that word is equal to or larger than that of the FFTC and the processor is in BFP FFT mode (FFTB 412 is set), then sticky bit FFTS 418 is set. Note that such a comparison can be performed equivalently in many different ways. For example, A>B is equivalent to B<A, to A$\geq$B negated, to B$\geq$A negated, 2A>2B, $-$A<$-$B, A$\geq$B$-$1, and so forth. Often the precise way a comparison is made is influenced by what is easiest to do in hardware. Thus, the terms "compare", "compared", and "comparison" herein denote any relative magnitude test without limitation to a specific implementation or mathematical formulation. Furthermore, the term "exceeded the magnitude" herein denotes a positive outcome of such a comparison without limitation to a specific implementation or mathematical formulation. As non-limiting examples, if the comparison is formulated as A$\geq$B$-$1, then A is said to have exceeded the magnitude if the test result is positive; if the comparison is formulated as $-$A<$-$B, then A is said to have exceeded the magnitude if the test results in a lesser-than inequality.

Hereinafter, the term "less than" includes both less-or-equal ($\leq$) and less (<).

Figure 5:
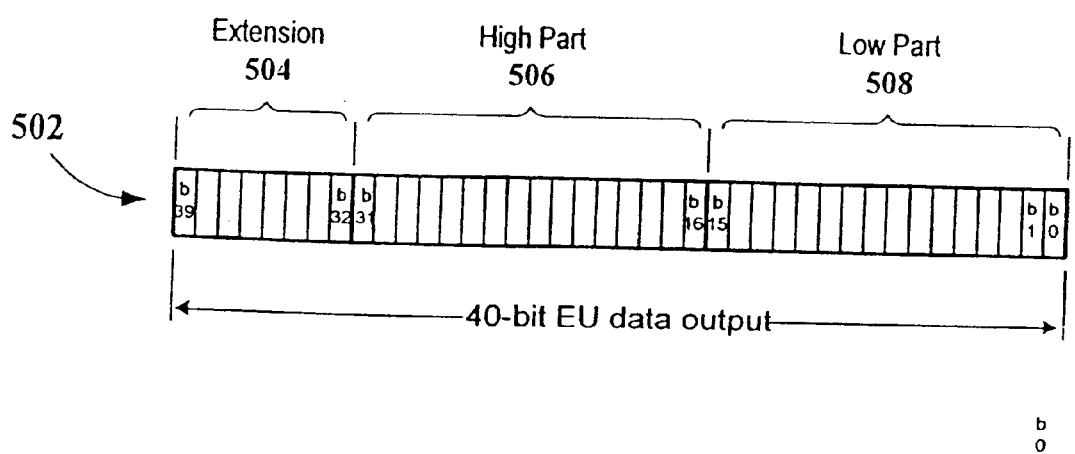
FIG. 5 shows the execution unit output data value partition.

A block diagram showing the hardware processing involved for the present invention is shown in FIG. 6, which illustrates a 16 bit processor as an example, and therefore the EU output data value is, in general, 40 bits (as in FIG. 5). As shown in FIG. 6, an execution unit 420 contains rounding unit 407, which receives a 40 bit input value and outputs a 40 bit output value after rounding. The term "rounding" herein refers to "two's complement" rounding, in which an add unit 422 performs the rounding with either a first constant 424 or a second constant 426. Second constant 426 is selected when SC 414 is set. Effectively, rounding unit 407 adds either the value stored in rounding adjustment 324 (first constant 424) or else twice this value (second constant 426).

Execution unit 420 then outputs EU output data value 502. High part 506 of EU output data value 502 can be stored in a data memory 610 via a data bus 608. It is possible to scale down EU output data value 502 by a factor of 2 prior to storing in a scale-before-store operation 604 via scale down by 2 unit 408 under control of SC 414. Scale-before-store operation 604 results in a one-bit right shift, wherein bit 0, the least significant bit (LSB) of EU output data value 502, is lost. In order to determine whether to apply the scale-before-store on the kth stage, it is necessary to test stage k$-$1 by a compare operation, as previously described. Instead of a fixed comparison constant, however, the mechanism according to the present invention allows the programmer to specify an arbitrary comparison constant, by loading FFTC 404 under program control via FFTC control 405 in a loading step 616. Then, if the stored value on data bus 608 exceeds the comparison constant stored in FFTC 404, then an output 618 of compare absolute value unit 406 will be true. Output 618 is fed to an AND function 612, whose other input is FFTB 412. FFTB 412 enables or disables the setting of FFTS, depending on whether FFTB 412 is set or cleared, respectively. If FFTB 412 is set and output 618 is true, then FFTS 418 is set under control of FFTS control 419. The programmer can clear FFTS 418 via FFTS control 419 under software command via a reset 614.

Figure 3:
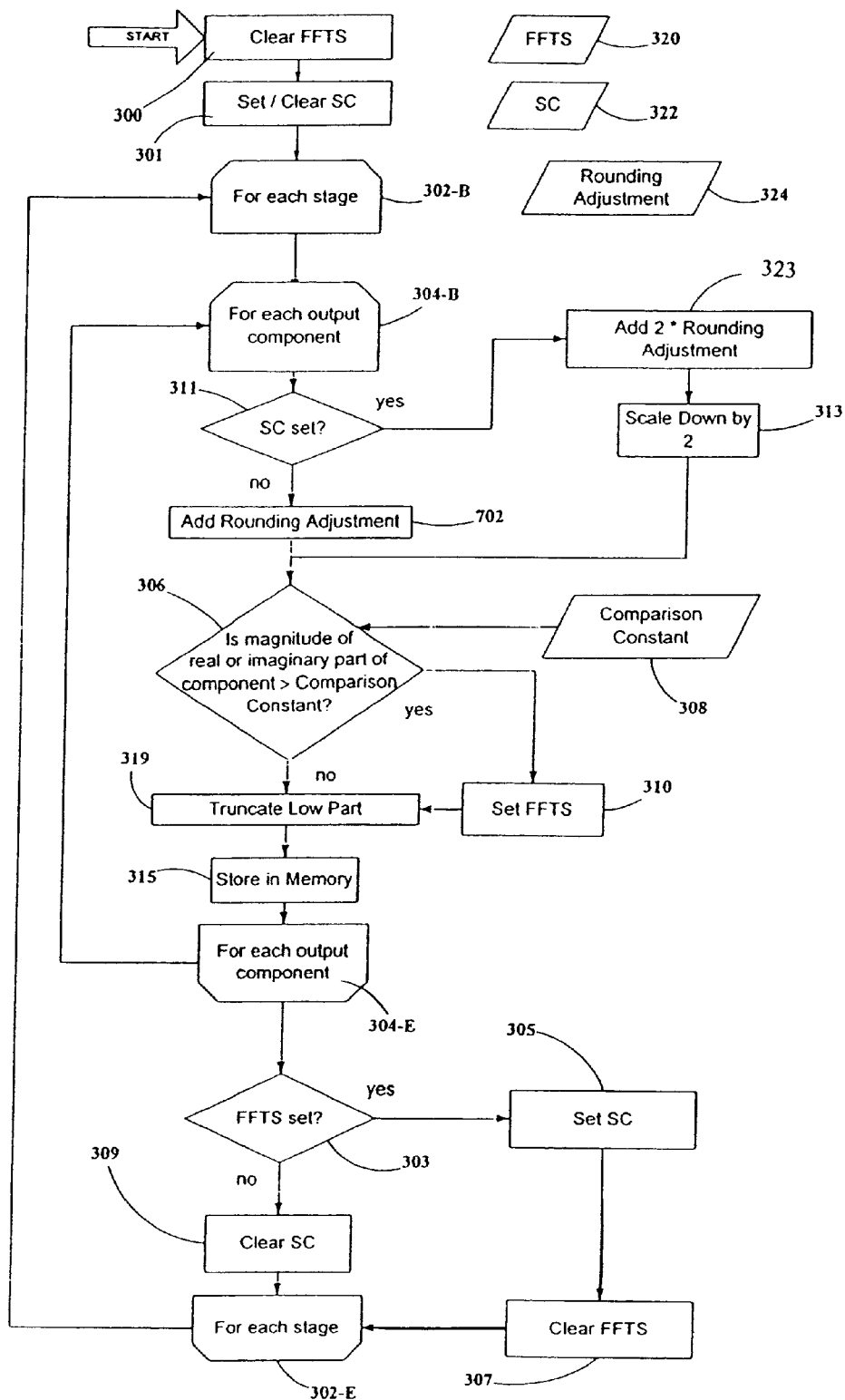
FIG. 3 shows conceptually the prior art scaling decision and rounding operation flowchart.
Figure 7:
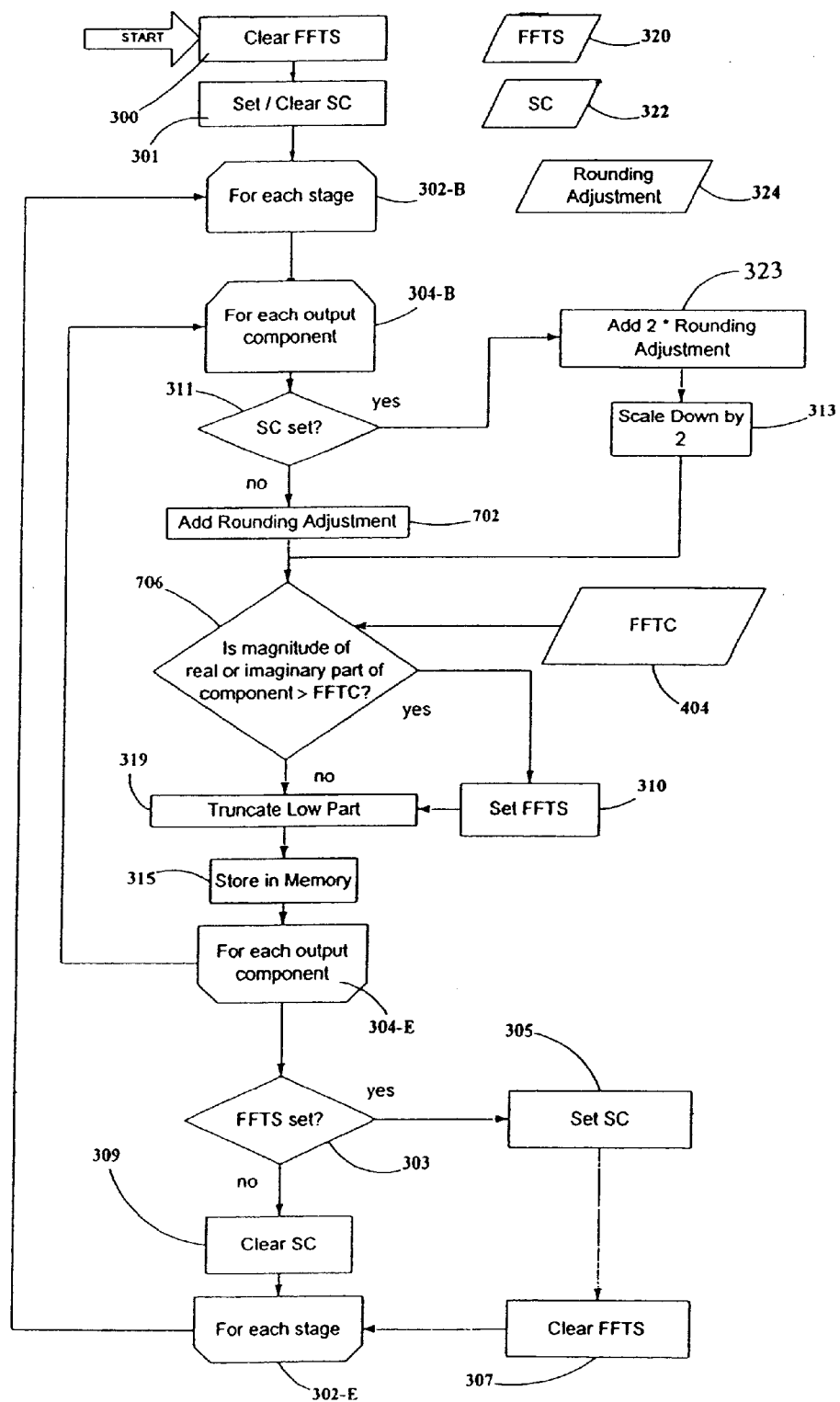
FIG. 7 shows conceptually the scaling decision and rounding operation flowchart according to the present invention.

FIG. 7 shows the method of processing according to the present invention. FIG. 7 shows the flowchart of the procedure according to the present invention. It is noted that the steps of FIG. 7 are predominantly similar to those of FIG. 3, with differences as follows: First, instead of comparison constant 308, there is FFTC 404, and therefore a decision point 706 performs a comparison against FFTC 404.

According to a preferred embodiment of the present invention, the rounding operation is preferably combined with other operations in the same instruction. A more preferred example of such an instruction is an "add and round" instruction.

Hardware logic for the operations of FIG. 6 and FIG. 7 may be implemented by various methods well-known in the art.

While the invention has been described with respect to a limited number of embodiments, it will be appreciated that many variations, modifications and other applications of the invention may be made.

What is claimed is:

1. A processor for performing a block floating point FFT on a plurality of data values, the processor executing a program, the processor comprising:

(a) an FFT compare register, said FFT compare register operative to contain a programmable comparison constant which can be loaded under control of the program, said programmable comparison constant having a first magnitude;

(b) an execution unit having an output data value, said output data value having a second magnitude;

(c) a compare absolute value unit for comparing said second magnitude to said first magnitude;

(d) a scale down by 2 unit for dividing said output data value by a factor of 2;

(e) a scale-before-store bit for activating said scale down by 2 unit; and (f) an FFT sticky status bit for indicating that said second magnitude has exceeded said first magnitude.

2. The processor of claim 1, wherein the execution unit further comprises:

(i) a rounding unit for rounding said output data value substantially before said execution unit outputs said output data value.

3. An improvement to a processor for performing a block floating point FFT on a plurality of data values, the processor executing a program, the processor including an execution unit, an FFT block floating point bit, a compare absolute value unit, a scale down by 2 unit, a scale-before-store bit, and an FFT sticky status bit, the improvement comprising an FFT compare register, said FFT compare register operative to contain a programmable comparison constant which is loadable under control of the program.

4. A method for performing a block floating point FFT on a plurality of data values having absolute values utilizing a processor executing a program, the processor including an execution unit, a compare absolute value unit, a scale down by 2 unit, a scale-before-store bit for enabling a scale-before-store mode, a user-loadable FFT compare register, and an FFT sticky status bit, the method comprising the steps of:

(a) activating, if the scale-before-store mode is enabled, the scale down by 2 unit;

(b) comparing each of the plurality of data values with the FFT compare register;

(c) setting, if a data value absolute value is not less than the FFT compare register, the FFT sticky status bit; and (d) enabling, if the FFT sticky status bit is set, the scale-before-store mode.

5. The method as in claim 4, wherein the processor further includes a rounding unit for performing a rounding operation and a rounding adjustment, the method further comprising the steps of:

(e) if the scale-before-store mode is not enabled: adding the rounding adjustment to the data values, by the rounding unit; and (f) if the scale-before-store mode is enabled: adding twice the rounding adjustment to the data values, by the rounding unit.

6. The method as in claim 4, wherein said enabling of the scale-before-store mode is effected by setting the scale-before-store bit.

\* \* \* \* \*